US009538075B2

(12) United States Patent
Lumsdaine et al.

(10) Patent No.: US 9,538,075 B2
(45) Date of Patent: Jan. 3, 2017

(54) FREQUENCY DOMAIN PROCESSING TECHNIQUES FOR PLENOPTIC IMAGES

(71) Applicant: INDIANA UNIVERSITY RESEARCH AND TECHNOLOGY CORPORATION, Indianapolis, IN (US)

(72) Inventors: Andrew Lumsdaine, Bloomington, IN (US); Jeremiah Willcock, Bloomington, IN (US); Yuduo Zhou, Bloomington, IN (US); Lili Lin, Bloomington, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 0 days.

(21) Appl. No.: 14/585,380

(22) Filed: Dec. 30, 2014

(65) Prior Publication Data
US 2015/0187047 A1 Jul. 2, 2015

Related U.S. Application Data

(60) Provisional application No. 61/921,868, filed on Dec. 30, 2013.

(51) Int. Cl.
*G06T 5/10* (2006.01)
*H04N 13/02* (2006.01)
(Continued)

(52) U.S. Cl.
CPC ............ *H04N 5/23229* (2013.01); *G06T 5/10* (2013.01); *G06T 5/50* (2013.01); *H04N 5/2254* (2013.01);
(Continued)

(58) Field of Classification Search
CPC .. H04N 5/23229; H04N 5/2254; H04N 13/02; G06T 5/10; G06T 5/50; G06T 2200/21; G06T 2207/10052
(Continued)

(56) References Cited

U.S. PATENT DOCUMENTS

| 725,567 | A | 4/1903 | Ives |
| 2,039,648 | A | 5/1936 | Ives |

(Continued)

FOREIGN PATENT DOCUMENTS

| EP | 1548481 | 6/2005 |
| WO | 0137025 | 5/2001 |

(Continued)

OTHER PUBLICATIONS

Lumsdaine et al. ("The focused plenoptic camera," International Conference on Computational Photography, Apr. 2009).*
(Continued)

*Primary Examiner* — Yubin Hung
(74) *Attorney, Agent, or Firm* — Faegre Baker Daniels LLP

(57) ABSTRACT

One embodiment is a method of operating a plenoptic image processing system. The method includes storing plenoptic image data in a non-transitory computer readable memory of the system. The plenoptic image data includes data of a plurality of microimages. The method includes applying a frequency domain transform to the stored plenoptic image data to provide a frequency domain plenoptic image data structure stored in the memory, and processing the data structure using an extended slice technique to select a focal plane from the data structure. The extended slice technique comprises taking multiple slices of the frequency domain transformed plenoptic image data structure and configuring the multiple slices to provide extended slice data. The
(Continued)

method further includes applying an inverse frequency domain transform to the extended slice data to provide inverse transform extended slice data, and providing an image output based upon the inverse transformed extended slice data.

20 Claims, 15 Drawing Sheets

(51) Int. Cl.
*H04N 5/232* (2006.01)
*H04N 5/225* (2006.01)
*G06T 5/50* (2006.01)

(52) U.S. Cl.
CPC ........... *H04N 13/02* (2013.01); *G06T 2200/21* (2013.01); *G06T 2207/10052* (2013.01)

(58) Field of Classification Search
USPC ................................................. 382/154, 280
See application file for complete search history.

(56) References Cited

U.S. PATENT DOCUMENTS

| | | | |
|---|---|---|---|
| 3,985,419 A | 10/1976 | Matsumoto et al. | |
| 4,180,313 A | 12/1979 | Inuiya | |
| 4,193,093 A | 3/1980 | St. Clair | |
| 4,732,453 A | 3/1988 | de Montebello et al. | |
| 4,849,782 A | 7/1989 | Koyama et al. | |
| 5,076,687 A | 12/1991 | Adelson | |
| 5,361,127 A | 11/1994 | Daily | |
| 5,400,093 A | 3/1995 | Timmers | |
| 5,659,420 A | 8/1997 | Wakai et al. | |
| 5,729,011 A | 3/1998 | Sekiguchi | |
| 5,946,077 A | 8/1999 | Nemirovskiy | |
| 6,097,541 A | 8/2000 | Davies et al. | |
| 6,137,937 A | 10/2000 | Okano et al. | |
| 6,268,846 B1 | 7/2001 | Georgiev | |
| 6,301,416 B1 | 10/2001 | Okano et al. | |
| 6,339,506 B1 | 1/2002 | Wakelin et al. | |
| 6,351,269 B1 | 2/2002 | Georgiev | |
| 6,476,805 B1 | 11/2002 | Shum et al. | |
| 6,738,533 B1 | 5/2004 | Shum et al. | |
| 6,838,650 B1 | 1/2005 | Toh | |
| 7,054,067 B2 | 5/2006 | Okano et al. | |
| 7,620,309 B2 | 11/2009 | Georgiev | |
| 7,732,744 B2 | 6/2010 | Utagawa | |
| 7,792,423 B2 | 9/2010 | Raskar et al. | |
| 8,111,320 B2 | 2/2012 | Drazic et al. | |
| 8,126,323 B2 | 2/2012 | Georgiev et al. | |
| 8,155,456 B2 | 4/2012 | Babacan et al. | |
| 8,160,439 B2 | 4/2012 | Georgiev et al. | |
| 8,189,065 B2 | 5/2012 | Georgiev et al. | |
| 8,189,089 B1 | 5/2012 | Georgiev et al. | |
| 8,228,417 B1 | 7/2012 | Georgiev et al. | |
| 8,238,738 B2 | 8/2012 | Georgiev | |
| 8,244,058 B1 | 8/2012 | Intwala et al. | |
| 8,290,358 B1 | 10/2012 | Georgiev | |
| 8,315,476 B1 | 11/2012 | Georgiev et al. | |
| 8,345,144 B1 | 1/2013 | Georgiev et al. | |
| 8,358,366 B1 | 1/2013 | Georgiev | |
| 8,379,105 B2 | 2/2013 | Georgiev et al. | |
| 8,380,060 B2 | 2/2013 | Georgiev et al. | |
| 8,400,555 B1 | 3/2013 | Georgiev et al. | |
| 8,401,316 B2 | 3/2013 | Babacan et al. | |
| 8,471,920 B2 | 6/2013 | Georgiev et al. | |
| 8,559,756 B2 | 10/2013 | Georgiev et al. | |
| 8,611,693 B2 * | 12/2013 | Intwala ................... G06T 5/10 382/254 |
| 8,625,931 B2 | 1/2014 | Hadap et al. | |
| 8,665,341 B2 | 3/2014 | Georgiev et al. | |
| 8,675,993 B2 | 3/2014 | Hadap et al. | |
| 8,724,000 B2 | 5/2014 | Georgiev et al. | |
| 8,749,694 B2 | 6/2014 | Georgiev et al. | |
| 8,803,918 B2 | 8/2014 | Georgiev et al. | |
| 8,817,015 B2 | 8/2014 | Georgiev et al. | |
| 2001/0012149 A1 | 8/2001 | Lin et al. | |
| 2001/0050813 A1 | 12/2001 | Allio | |
| 2002/0140835 A1 | 10/2002 | Silverstein | |
| 2003/0231255 A1 | 12/2003 | Szajewski et al. | |
| 2004/0114807 A1 | 6/2004 | Lelescu et al. | |
| 2004/0223214 A1 | 11/2004 | Atkinson | |
| 2005/0088714 A1 | 4/2005 | Kremen | |
| 2005/0122418 A1 | 6/2005 | Okita et al. | |
| 2007/0252074 A1 * | 11/2007 | Ng .................... G02B 3/0056 250/208.1 |
| 2008/0152215 A1 | 6/2008 | Horie et al. | |
| 2008/0165270 A1 | 7/2008 | Watanabe et al. | |
| 2008/0187305 A1 * | 8/2008 | Raskar ............... G02B 27/0075 396/268 |
| 2008/0193026 A1 | 8/2008 | Horie et al. | |
| 2009/0041381 A1 | 2/2009 | Georgiev et al. | |
| 2009/0041448 A1 | 2/2009 | Georgiev et al. | |
| 2009/0140131 A1 | 6/2009 | Utagawa | |
| 2009/0185801 A1 * | 7/2009 | Georgiev ................ G03B 15/00 396/332 |
| 2010/0026852 A1 | 2/2010 | Ng et al. | |
| 2010/0085468 A1 | 4/2010 | Park et al. | |
| 2010/0265386 A1 | 10/2010 | Raskar et al. | |
| 2011/0080491 A1 | 4/2011 | Drazic et al. | |
| 2012/0043963 A1 * | 2/2012 | Rapoport ............. A61B 5/0073 324/307 |
| 2012/0140024 A1 | 6/2012 | Lubell et al. | |
| 2014/0239071 A1 * | 8/2014 | Hennick ........... G06K 7/10732 235/455 |
| 2014/0327566 A1 * | 11/2014 | Burgio .................. G01S 13/72 342/108 |

FOREIGN PATENT DOCUMENTS

| | | |
|---|---|---|
| WO | 2006057838 | 6/2006 |
| WO | 2007115281 | 10/2007 |

OTHER PUBLICATIONS

Ng, Ren ("Fourier Slice Photography," Proceedings of ACM SIGGRAPH, vol. 24, Issue 3, Jul. 2005, pp. 735-744)—[Fig. 8 and Sect. 6.1: Algorithm].*

Perez et al. ("Fourier slice super-resolution in plenoptic cameras," IEEE International Conference on Computational Photography, Apr. 28-29, 2012).*

Georgiev et al. ("Focused plenoptic camera and rendering," Journal of Electronic Imaging 19(2), Apr.-Jun. 2010).*

Fourier Lumsdaine, Andrew et al., "Fourier Analysis of the Focused Plenoptic Camera", SPIE—IS&T Eletronic Imaging, SPIE vol. 8667 Devices, 2013.

* cited by examiner

1101

1102

1103

1301

1302

1303

1401
 1402
 1403
 1404
 1405
 1406

1501

1502

FREQUENCY DOMAIN PROCESSING TECHNIQUES FOR PLENOPTIC IMAGES

CROSS REFERENCE

The present application claims the benefit of and priority to U.S. Application No. 61/921,868, filed Dec. 30, 2013, the disclosure of which is hereby incorporated by reference.

BACKGROUND

Plenoptic cameras (also known as lightfield cameras) have recently become commercially available for industrial and consumer applications. Plenoptic cameras capture the distribution of light rays in space based upon a four dimensional plenoptic function. The four dimensional information captured by a plenoptic camera may be utilized, for example, in rendering 3D imagery, providing computer vision functionality, and allowing photographers to set the focus in a scene after the image is captured. Both spatial and Fourier slice techniques have been utilized in processing and rendering images captured by conventional plenoptic cameras, however, regardless of the technique(s) used, conventional plenoptic cameras render 2D images that are too small to satisfy the demands and expectations of modern imaging and photography applications.

The focused plenoptic camera is a recently developed alternative to the conventional plenoptic camera. The focused plenoptic camera uses a microlens array as an imaging system focused on the focal plane of the main camera lens. The focused plenoptic camera captures lightfields with a different tradeoff between spatial and angular information than with the conventional plenoptic camera, and can capture lightfields with significantly higher spatial resolution than conventional plenoptic cameras. As a result, spatial resolution of focused plenoptic cameras may be provided at a level comparable to that of non-plenoptic digital cameras.

Existing plenoptic image processing systems and processes suffer from a number of disadvantages and shortcomings. Existing spatial transform techniques for images captured by either a conventional plenoptic camera or a focused plenoptic camera have higher computational complexity than Fourier techniques when many rendered images are being generated. More specifically, existing spatial transform techniques have an $O(n^4)$ time cost per image, while the techniques disclosed herein may have an $O(n^4 \log n)$ time cost up front but only an $O(n^2)$ time cost required per image. Existing filtering techniques for noise removal in plenoptic images are quite complex because they are based on the original image rather than its Fourier transform. In contrast, the systems and processes disclosed herein make filtering the image much easier both before and after rendering. Existing Fourier techniques are specific to images from a conventional plenoptic camera and even in that application suffer from limitations and drawbacks including limited data capture and limited image resolution. There remains a significant unmet need for the unique apparatuses, methods, systems and techniques disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art to which the invention relates.

SUMMARY

Unique apparatuses, methods, systems and techniques of Fourier-based image processing and rendering for focused plenoptic images are disclosed. A variety of embodiments, forms, objects, features, advantages, aspects, and benefits shall become apparent from the following description and figures.

DETAILED DESCRIPTION

Figure 1:
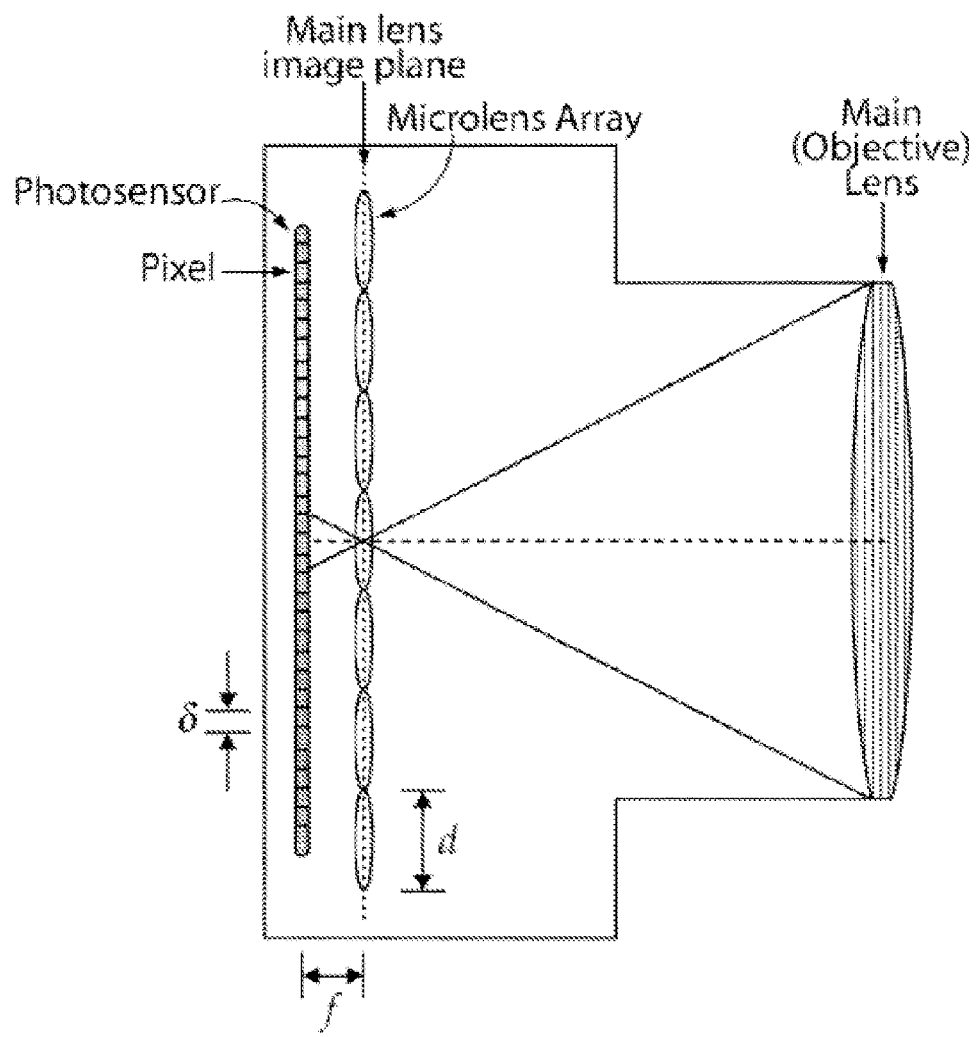
FIG. 1 schematically illustrates an exemplary conventional plenoptic camera.

With reference to FIG. 1 there is illustrated an exemplary conventional plenoptic camera including the optics thereof.

Plenoptic cameras, such as the example illustrated in FIG. 1, are optical devices that capture radiance r(q,p) by multiplexing a 4D plenoptic function onto a 2D sensor. Whereas a traditional camera captures an image by physically integrating the intensities of all of the rays impinging on each sensor pixel, a plenoptic camera instead captures rays (or thin bundles of rays) separately. As illustrated in FIG. 1, the conventional approach to separating, and then individually capturing, the rays in a scene is to put a microlens array on the main lens image plane (where the photosensor would be in a conventional camera) while placing the sensor itself some distance behind the microlens array. In other words, the photosensor is placed at a distance $f$ behind the microlens array, where $f$ is the focal distance of each individual microlens. In this configuration, the rays that converge at the microlens array will diverge as they propagate behind it. Individual pixels in the sensor now capture separate rays. Thus, the intensity as a function of position at the sensor represents the radiance as a function of direction at the position q of the pinhole.

Figure 2:
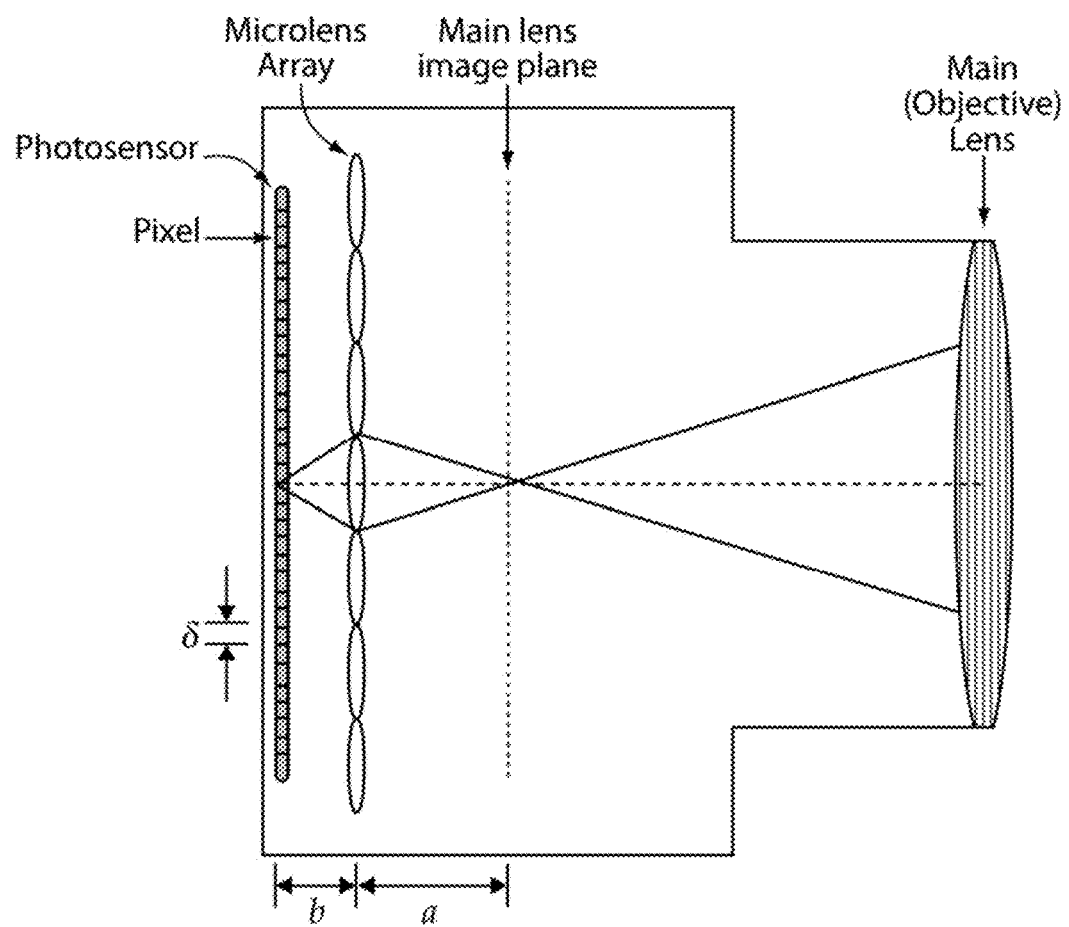
FIG. 2 schematically illustrates an exemplary focused plenoptic camera.

With reference to FIG. 2 there is illustrated an exemplary focused plenoptic camera including the optics thereof. In contrast to conventional plenoptic cameras, focused plenoptic cameras, such as the example illustrated in FIG. 2, place the photosensor at a distance b behind the microlens array and focus the main lens a distance a in front of it, where a, b, and f together satisfy the lens equation $1/a+1/b=1/f$. Thus, in the focused plenoptic camera, each microlens forms a relay system with the main lens. The different optical configurations of conventional versus focused plenoptic cameras result in radiance being captured differently as will now be described in connection with FIGS. 3-5.

Figure 3:
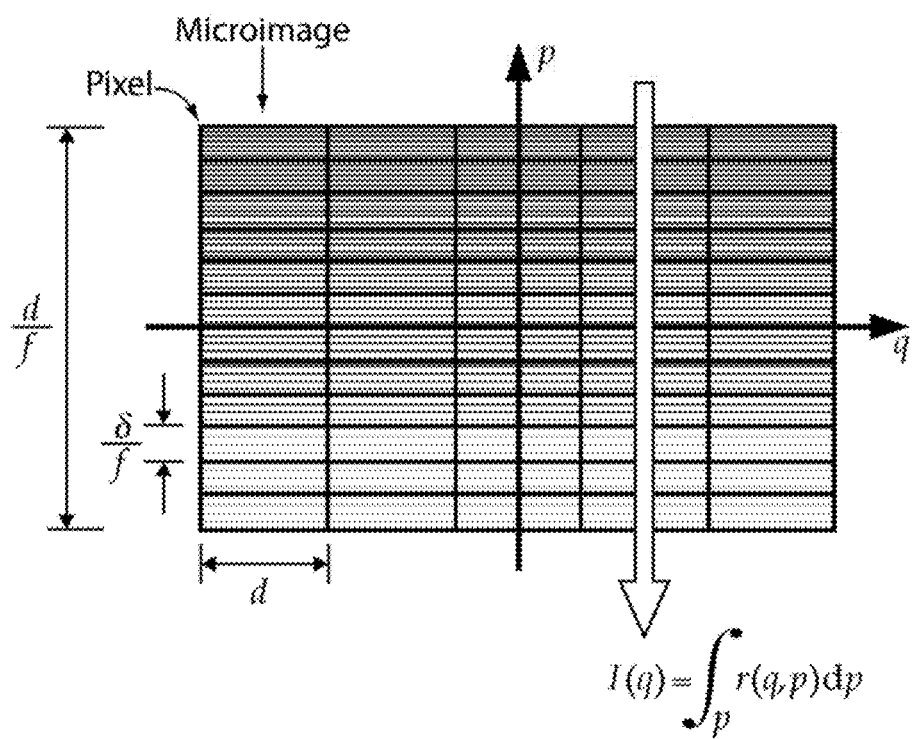
FIG. 3 illustrates radiance at the microlens plane captured by a conventional plenoptic camera.
Figure 4:
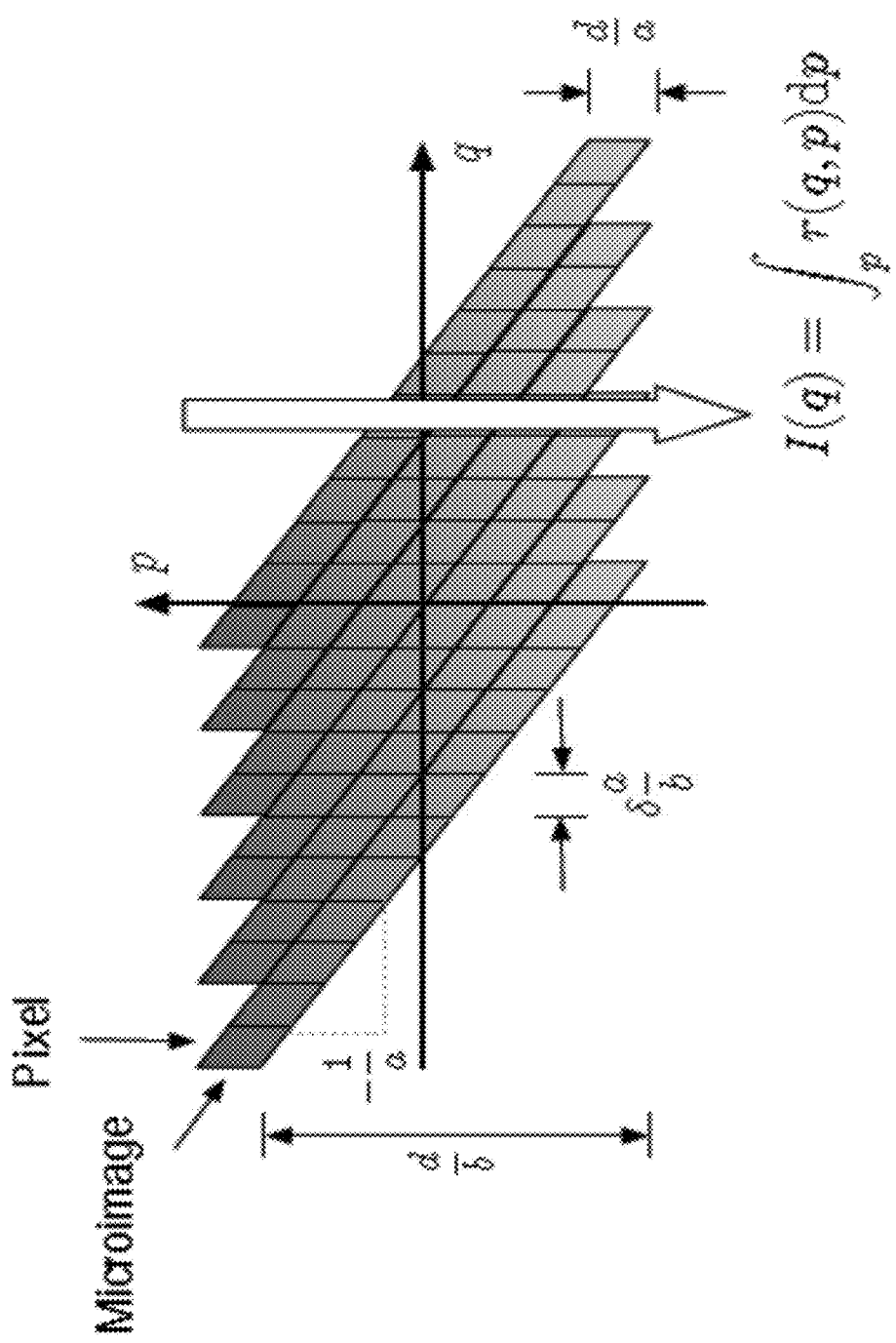
FIG. 4 illustrates radiance at the main image plane captured by a focused plenoptic camera.
Figure 5:
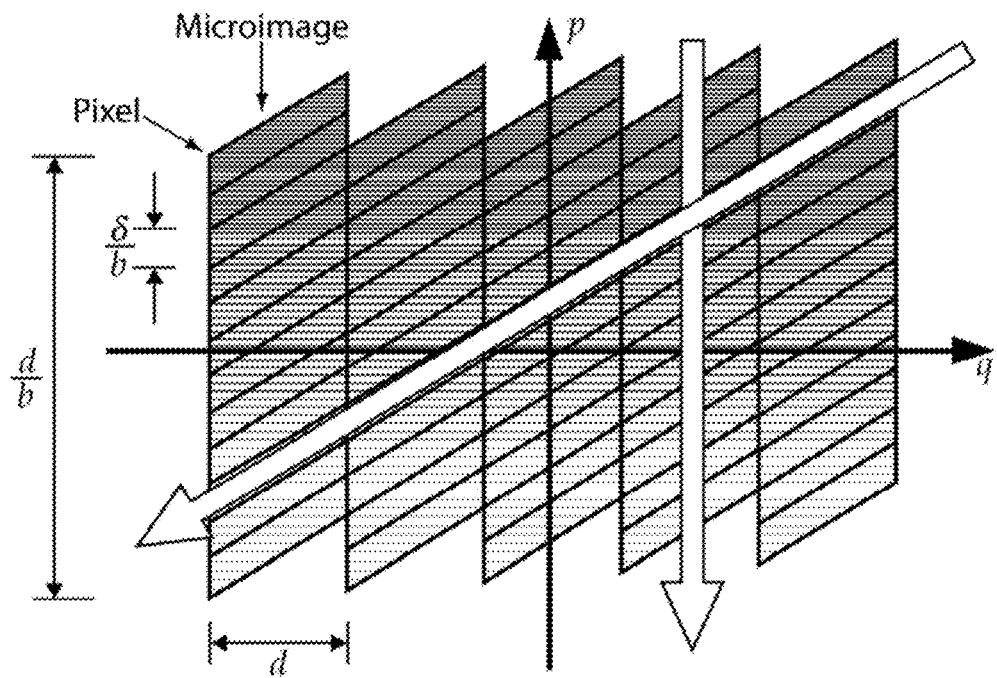
FIG. 5 illustrates radiance at the microlens plane captured by a focused plenoptic camera.

FIGS. 3-5 illustrate how radiance is captured by conventional plenoptic cameras and by focused plenoptic cameras. FIG. 3 shows a phase space diagram of the radiance at the microlens plane as it is captured by a conventional plenoptic camera. In this case, each microimage comprises a vertical "stack" of pixels in the phase plane. FIG. 4 shows a phase space diagram of the radiance at the main (objective) lens image plane as captured by a focused plenoptic camera. Here, each microimage comprises a slanted region of the phase plane. FIG. 5 shows the radiance captured by a focused plenoptic camera at the microlens plane. The rendering of an image from captured radiance will now be described.

An image I(q) is rendered from a captured radiance r(q,p) according to Eq. (1):

$$I(q) = \int_q r(q,p) dp \qquad \text{Eq. (1)}$$

In the case of the conventional plenoptic camera, Eq. (1) reduces to a summation over all of the pixels in each microlens, resulting in a rendered image having one pixel per microimage in the captured radiance. This process is illustrated in FIG. 3 for one output pixel with the vertical arrow. A similar process can be applied to radiance captured by the focused plenoptic camera. However, in this case, the captured radiance must be interpreted differently. To render radiance captured at the main (objective) lens image plane by the focused plenoptic camera, Eq. (1) is applied as shown in FIG. 4. If captured radiance is represented in rectilinear form, rendering is performed at a slant, as shown in FIG. 5. While focused radiance could be rendered with conventional techniques (shown by the vertical arrow in FIG. 5, this would yield significantly lower resolution.

Figure 6:
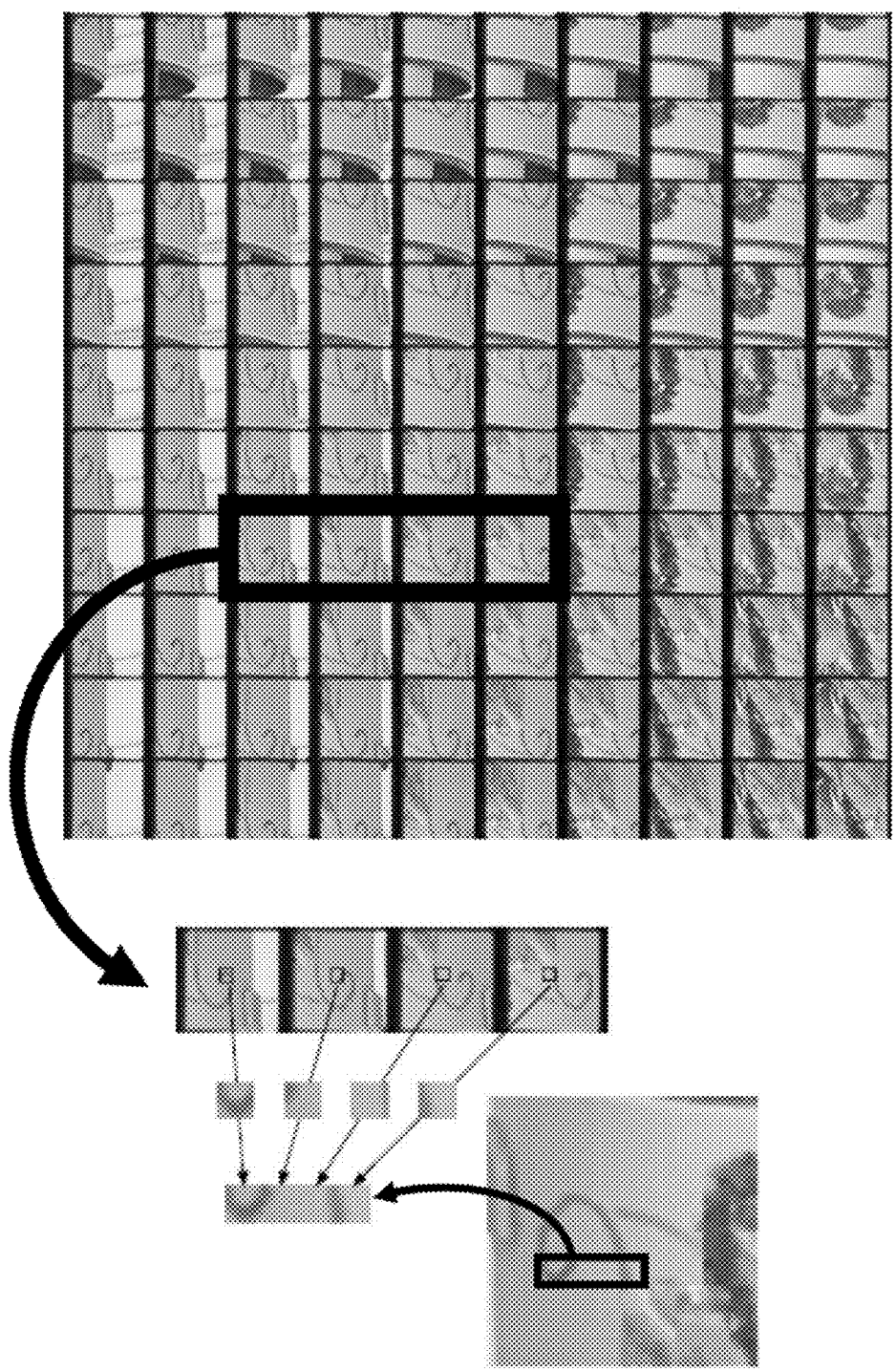
FIG. 6 illustrates photographic images of a section of a microimage array captured by the sensor of a focused plenoptic camera and an exemplary operation by which regions of neighboring microimages become contiguous parts of a rendered image.

FIG. 6 provides a further illustration of a focused plenoptic rendering process. Since a focused plenoptic camera is constructed as a relay imaging system, each microimage is a focused image that is a small sample of a larger complete image, namely the image at the main lens image plane. Neighboring microimages sample overlapping, shifted regions of the main lens image plane. Thus, interior regions of neighboring microimages become contiguous parts of the rendered image.

Certain exemplary embodiments disclosed herein utilize Fourier slice refocusing of focused plenoptic data. It shall be appreciated that the techniques disclosed herein may be implemented through a variety of apparatuses, systems and processes, for example, through a computer including a data input for receiving input focused plenoptic image data, user inputs such as a keyboard or mouse, one or more memory devices configured to store the input focused plenoptic image data, one or more processors configured to process the stored focused plenoptic image data in accordance with one or more of the techniques disclosed herein, and a monitor configured to display visual output based upon rendered image information output by the one or more processors. It shall be appreciated that this configuration is but one example of image processing and rendering apparatuses and systems that may implement the techniques and processes disclosed herein. Furthermore, while certain exemplary embodiments are described as utilizing Fourier transform techniques, it shall be appreciated that a variety of frequency domain transformation techniques may be utilized including classical Fourier transforms, discrete cosine transforms, and Fast Fourier Transforms ("FFT") to name several examples.

Certain exemplary embodiments provide Fourier slice refocusing of focused plenoptic image data based upon the Central Slice Theorem in the context of plenoptic imaging. The Fourier transform of I(q) from Eq. (1) is given by Eq. (2):

$$\hat{I}(\omega_q) = \int_q I(q) e^{-i2\pi \omega_q q} dq \qquad \text{Eq. (2)}$$

Substituting Eq. (1) into Eq. (2) gives Eq. (3):

$$\hat{I}(\omega q) = \iint_{q,p} r(q,p) e^{-i2\pi \omega_q q} dq dp \qquad \text{Eq. (3)}$$

Setting $\omega_p = 0$ gives Eq. (4):

$$\hat{I}(\omega_q) = \hat{r}(\omega_q, 0) \qquad \text{Eq. (4)}$$

Thus, the Fourier transform of a 2D rendered image is the "DC" directional component of the Fourier transform of the 4D radiance, i.e., the slice where $\omega_p = 0$.

Refocusing of a plenoptic image is accomplished by applying a translational transformation, equivalent to optical focusing, which changes the physical distance between the sensor and the main lens. The radiance transform for applying a translation is given by using Eq. (4) with the transformation described by Eq. (5):

$$T_t \begin{bmatrix} 1 & t \\ 0 & 1 \end{bmatrix} \qquad \text{Eq. (5)}$$

Thus the transformed radiance r' is given by r'(q,p)=r(q−tp, p). This transformation is illustrated in the upper portion of FIG. 7. In the frequency domain, the corresponding transformation for translation is $\hat{r}'(\omega_q, \omega_p) = \hat{r}(\omega_q, \omega_p + t\omega_q)$. This transformation is illustrated in the lower portion of FIG. 7. Eq. (4) can then be used to render a refocused image from the frequency domain as an image focused at plane translated by distance t from the original focal plane according to Eq. (6)

$$\hat{I}(\omega_q) = \hat{r}(\omega_q, t\omega_q) \qquad \text{Eq. (6)}$$

Figure 7:
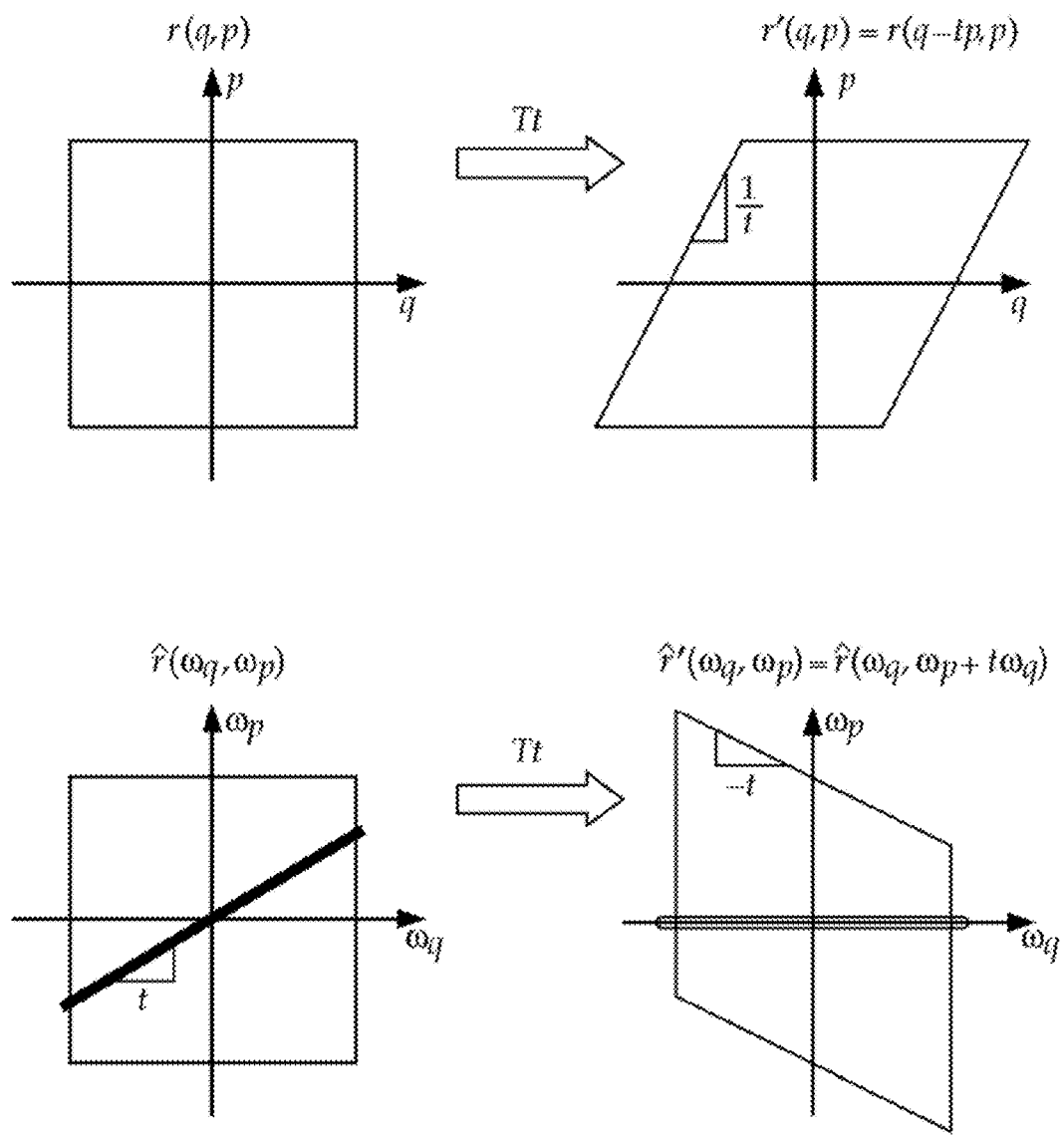
FIG. 7 illustrates spatial domain shearing due to translation and frequency domain shearing due to translation.

The Fourier slice for refocusing is shown with a grey line in the lower left portion of FIG. 7.

Figure 8:
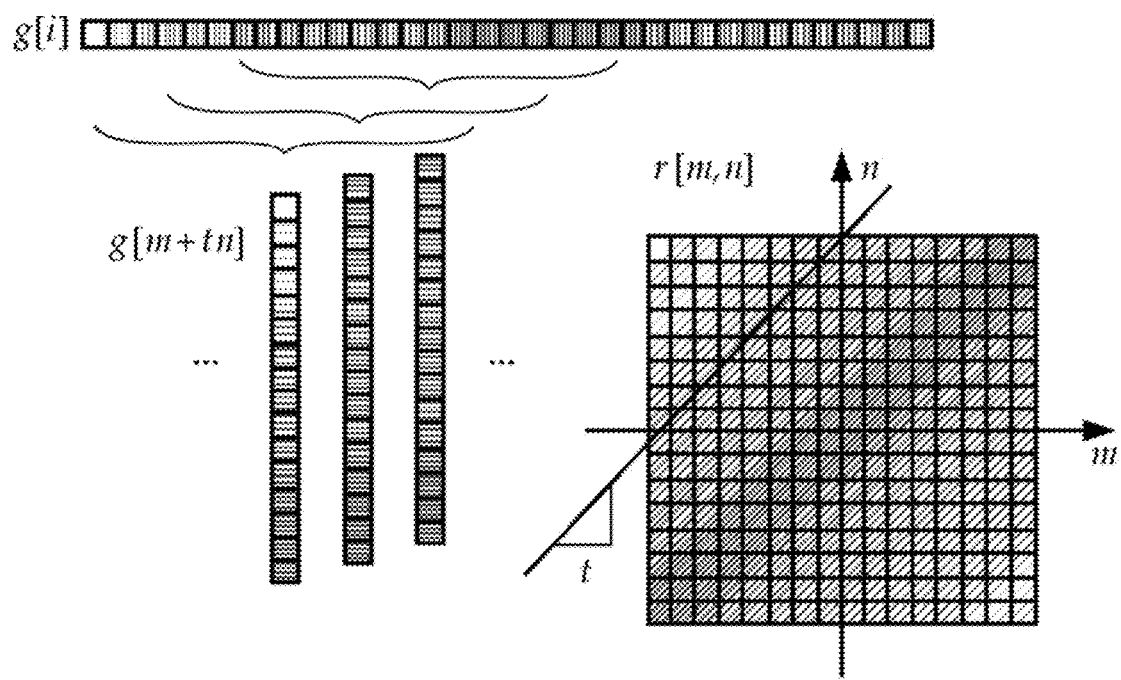
FIG. 8 illustrates a model for radiance captured by a focused plenoptic camera in which vertical columns of the 2D radiance are comprised of overlapping sections of a 1D function.

For clarity of description, the following derivation for the focused Fourier slice refocusing algorithm is for a two-dimensional discretized radiance r[m, n]. One of skill in the art will understand the extension to higher order multidimensional cases. We begin by positing the following model for a discretized radiance described by Eq. (7):

$$r[m,n]=g[n+tm] \qquad \text{Eq. (7)}$$

where r is a two-dimensional M×N array and g is a one-dimensional tM array. This model is illustrated in FIG. 8 and defines the radiance r as being comprised of shifted strips of g which is the case for the radiance sampled by the focused plenoptic camera as illustrated and described for real plenoptic data in connection with FIG. 6. Now, take the two-dimensional discrete Fourier transform given by Equations (8) and (9):

$$\hat{r}[j,k] = \sum_{n=0}^{N-1}\sum_{m=0}^{M-1} r[m,n] W_M^{-mj} W_N^{-nk} \qquad \text{Eq. (8)}$$

$$= \sum_{n=0}^{N-1}\sum_{m=0}^{M-1} g[n+tm] W_M^{-mj} W_N^{-nk} \qquad \text{Eq. (9)}$$

Where the notation $$W_M^{-mj} = e^{-2\pi i \frac{mi}{M}} \text{ and } W_N^{-nk} = e^{-2\pi i \frac{nk}{N}}.$$

We can convert the transform to be taken over a range of tM using properties of the complex exponential of Equations (10) (11) and (12):

$$\hat{r}[j,k] = \sum_{n=0}^{N-1}\sum_{m=0}^{M-1} g[n+tm] W_{tM}^{-tmj} W_N^{-nk} \qquad \text{Eq. (10)}$$

$$= \sum_{n=0}^{N-1}\sum_{m=0}^{M-1} g[n+tm] W_{tM}^{-tmj} W_N^{-nk\frac{tM}{N}} \qquad \text{Eq. (11)}$$

$$= \sum_{n=0}^{N-1}\sum_{m=0}^{M-1} g[n+tm] W_{tM}^{-tmj-nk\frac{tM}{N}} \qquad \text{Eq. (12)}$$

A slice can then be taken through $\bar{r}(j,k)$, where the slice is defined by $$k = \sigma\left(\frac{N}{M}j + iN\right)$$

for i=0, . . . , t−1. The slice is then described by Equations (13), (14), (15) and (16):

$$\hat{r}[j,k] = \hat{r}\left[j, \sigma\frac{N}{M}(j+Mi)\right] \qquad \text{Eq. (13)}$$

$$= \sum_{n=0}^{N-1}\sum_{m=0}^{M-1} g[n+tm] W_{tM}^{-tmj-n\sigma t(j+Mi)} \qquad \text{Eq. (14)}$$

$$= \sum_{n=0}^{N-1}\sum_{m=0}^{M-1} g[n+tm] W_{tM}^{-(j+Mi)(n\sigma t+tm)} W_{tM}^{tMmi} \qquad \text{Eq. (15)}$$

$$= \sum_{n=0}^{N-1}\sum_{m=0}^{M-1} g[n+tm] W_{tM}^{-(j+Mi)(n\sigma t+tm)} \qquad \text{Eq. (16)}$$

For a full resolution rendering condition, let σt =1 and refer $$\sigma = \frac{1}{t}$$

as the full resolution rendering condition. Furthermore note that that the quantity n+tm simply cycles through the values 0, . . . , tM−1 modulo tM a total of N jt times as described by Equations (17), (18), (19), and (20):

$$\hat{r}\left[j, \sigma\frac{N}{M}(j+Mi)\right] = \sum_{n=0}^{N-1}\sum_{m=0}^{M-1} g[n+tm] W_{tM}^{-(j+Mi)(n+tm)} \qquad \text{Eq. (17)}$$

$$= \frac{N}{t}\sum_{m=0}^{tM-1} g[m] W_{tM}^{-(j+Mi)m} \qquad \text{Eq. (18)}$$

$$= \frac{N}{t}\sum_{m=0}^{tM-1} g[m] W_{tM}^{-Mim} W_{tM}^{-jm} \qquad \text{Eq. (19)}$$

$$= \frac{N}{t}\hat{g}[j+Mi], \qquad \text{Eq. (20)}$$

$$i=0, \ldots, t-1, j=0, \ldots, M-1$$

In other words, we obtain the Fourier transform of g of length tM from the Fourier transform of r by concatenating together t different slices in f, displaced by N/t. Equivalently, if we let r̄' be the Fourier transform of r along with its aliases in the j direction, g is obtained by taking a slice of length tM through f' as is illustrated in FIG. 9.

Figure 9:
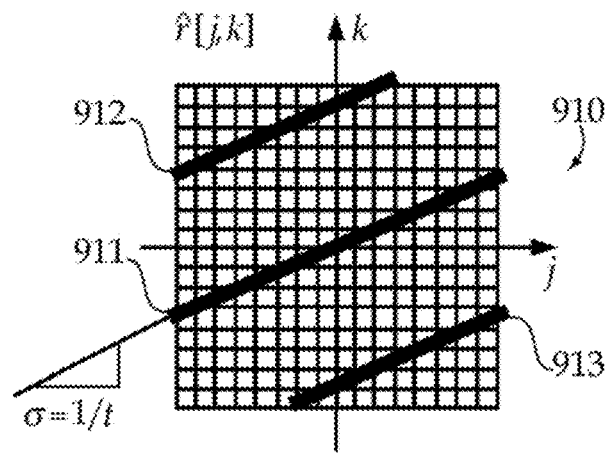
FIG. 9 illustrates an exemplary extended slice technique.
Figure 9:
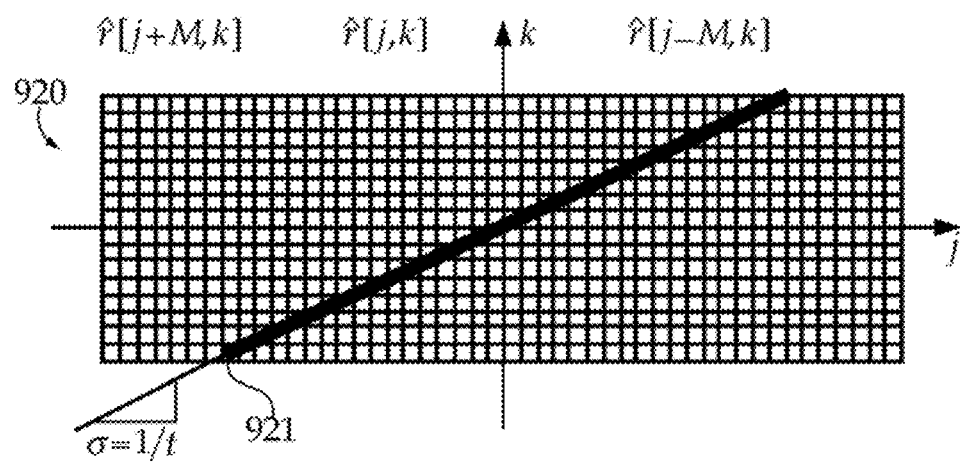

FIG. 9 illustrates an exemplary extended slice technique which may be performed on frequency domain plenoptic image data stored in array 910. It shall be appreciated that the frequency domain plenoptic image data may be captured by a conventional plenoptic camera or a focused plenoptic camera and may be transformed to the frequency domain using a variety of frequency domain transformation techniques. As illustrated in FIG. 9, a central slice 911 and slice extensions 912 and 913 are taken from array 910. The slice extensions 912 and 913 effectively wrap around the array 910 from the ends of central slice 911. The central slice 911 and slice extensions 912 and 913 may then be configured to provide an extended slice 921 as illustrated in graph 920. The extended slice 921 may be created by appending the slice extensions 912 and 913 to respective ends of central slice 911.

It shall be appreciated that the construction of extended slice 921 may be accomplished using only data of the central slice 911 and slice extensions 912 and 913, or by using additional non-sliced data from the array 910. In the illustrated example, central slice 911 passes through the origin at a predetermined slope which provides two slice extensions. It shall be appreciated that this slope may be varied and that central slices with a different slopes may provide different lengths for the central slice and slice extensions or may provide a greater number of slice extensions by wrapping around the graph 910 multiple times. It shall further be appreciated that the illustrated slicing techniques may performed on frequency domain plenoptic image data stored in a variety of data structures and that the geometric representation of the array 910 as a two dimensional graph is non-limiting.

Figure 10:
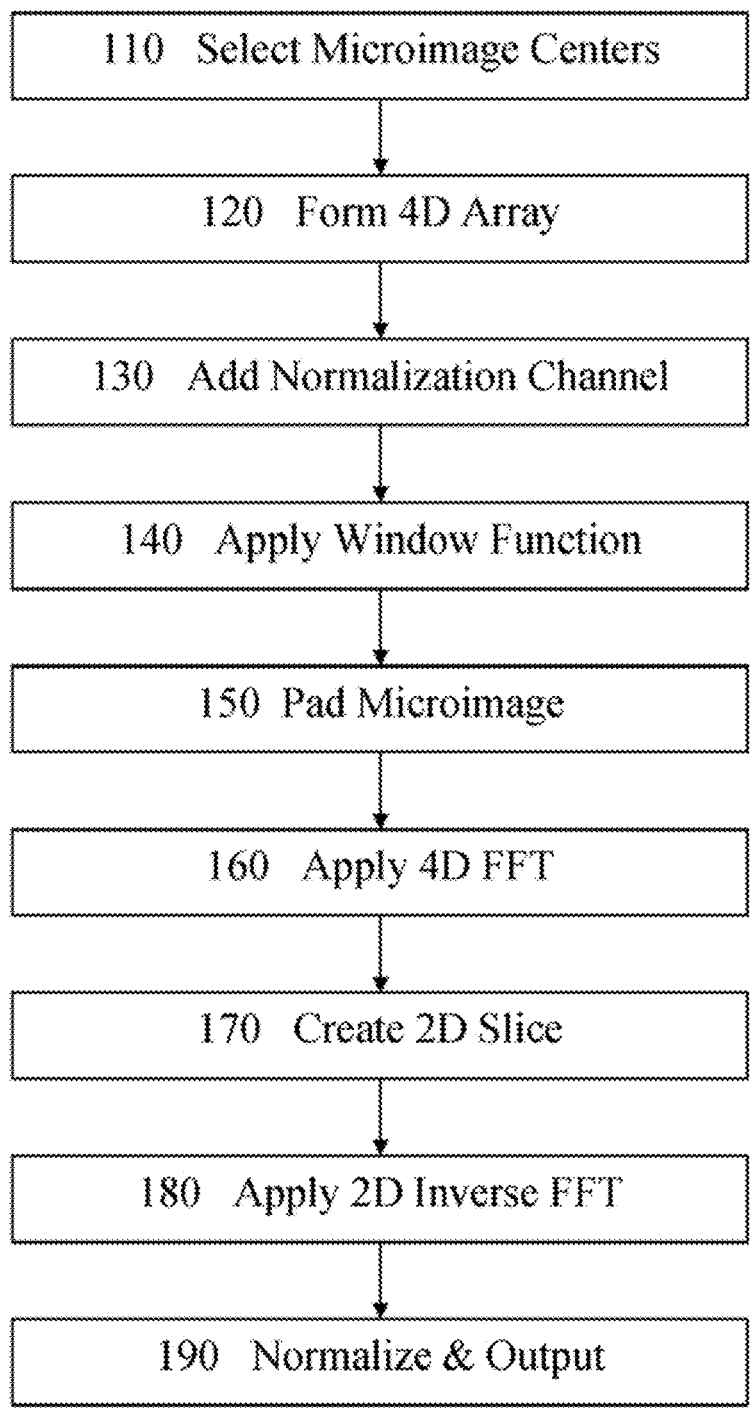
FIG. 10 illustrates a flow diagram according to an exemplary method including Fourier slice refocusing.

FIG. 10 illustrates an exemplary method 100 implementing a Fourier slice refocusing technique. A preferred implementation of method 100 was written in C++ to run on single-core or shared-memory/multicore computers. The GNU Scientific Library was used for the FFT and inverse FFT computations. Computations were performed in double precision using complex numbers (the C++ std::complex<double> type). Arrays were stored using the Blitz++ multi-dimensional array library. OpenMP is used to parallelize the parallel portions of the algorithm (for example, x and y 1D FFTs on different rows, p and q FFTs and slicing on different rows of microimages, etc.). Those portions account for most of the algorithm, especially when multiple output images are being generated. It shall be appreciated that the foregoing specifics are exemplary and that a variety of other implementations of method 100 are contemplated.

With continued reference to FIG. 10, method 100 begins at operation 110 which selects the center portion of each microimage. The outer edges of microimages are often noisy, and thus are removed before further processing. From operation 110 method 100 proceeds to operation 120.

Operation 120 forms a 4D array from the input image and optionally some padding microimages around it. The four dimensions of the array are the x and y positions in the grid of microimages and the x and y positions within each microimage. Padding is added around the full set of microimages to avoid the result wrapping around at its edges (since the shear operation applied in the frequency domain would otherwise be periodic). It shall be appreciated that the array of operation 120, as well as other arrays disclosed herein may be defined as a separate array for each color channel or a single array that contains all channels together. It shall be further appreciated that the array of operation 120, as well as other data arrays disclosed herein are non-limiting examples of data structures that may be stored in a non-transitory computer readable medium and that other types of data structures may be also utilizes provided that locations within the data structures can be individually identified to facilitate the slicing operations disclosed herein. Unless indicated to the contrary, the term array as related to data stored in a non-transitory computer readable medium is not limited to particular physical locations or addresses in such memory. From operation 120 method 100 proceeds to operation 130.

Operation 130 adds a normalization channel containing fully saturated values. The normalization channel is used to compensate for different numbers of microimages overlapping at different points in the output. The later division by the processed form of the normalization channel produces a weighted average of the microimages placed at each point. From operation 130 method 100 proceeds to operation 140.

Operation 140 applies a window function to reduce the effect of the outer portions of each microimage. The window function further removes the effects of noise at microimage edges, plus ensures that the output microimages blend more smoothly together. Applying the window to all four channels, including the normalization channel, reduces the weights of the outer portions of the microimages in the final averaging step. In the implementation, the outer 20% of each side of the microimage is reduced using a triangular window, applied separately (multiplicatively) to the x and y dimensions. From operation 140 method 100 proceeds to operation 150.

Operation 150 optionally pads each microimage to give more accuracy in the FFT output array. Zero-padding the input to a DFT is a an exemplary technique to obtain more frequency buckets in the output. Zero-padding gives a better interpolation accuracy of the frequencies than standard interpolation algorithms for smooth data. From operation 150 method 100 proceeds to operation 160

Operation 160 applies a 4D Fast Fourier Transform ("FFT") to the array. From operation 160 method 100 proceeds to operation 170.

Operation 170 creates a 2D slice from the array, interpolating values as necessary. A 2D plane is extracted from the 4D array, wrapping around at the edges of the set of microimages but not at the edges of a single microimage. Interpolation in the array when selecting elements from microimages is further described below. In a preferred form the interpolation only takes place within a single microimage; the points sampled along the plane are chosen so that each point is exactly in a single microimage. From operation 170 method 100 proceeds to operation 180

Operation 180 applies a 2D inverse FFT to the slice. From operation 180 method 100 proceeds to operation 190.

Operation 190 divides the other channels of the slice elementwise by the normalization channel. This step gives the weighted average mentioned above. Removing it would result in screen-door artifacts from the number of microimages summed at each output location varying over the image. The output image is then produced using the other channels' division results from this step.

It shall be appreciated that the normalization of operation 130 differs from embodiments which exclude normalization in several ways. More specifically, a new color channel is added to the input image and filled as if it was an all-white image. It is then filtered into a 4-d array just like the main image (including whatever masking, windowing, padding, etc. is done to the image), and processed as described below (i.e., frequency domain transform, slicing, inverse frequency domain transform) using the same steps as the rest of the image. After the inverse frequency domain transform step, the values of each pixel's other color channels are divided by that pixel's value in the normalization channel and the normalization channel is removed. The image is then stored or saved in memory. It shall be further appreciated that alternate techniques may be utilized to accomplish a similar effect as the normalization channel which may involve alternate computations.

The foregoing exemplary implementation is preferred for off-line processing of a single plenoptic lightfield into multiple result images with different focal planes. The operations may be rearranged to share work between different output images. In particular, operations 110, 120, 130 and 140 and two of the four dimensions of the 4D FFT of operations 160 are performed once on the input image, while padding and the rest of the FFT are done as needed when building output images. All output images are generated together, allowing the work of steps 110-160 (which are focal-plane-independent) to be amortized across multiple outputs. Thus, the modified loop structure is the following:
 a. Generate a 4D array of windowed portions of the microimages (steps 110-140 described above).
 b. Apply 1D FFTs in the x and y directions (i.e., corresponding points in multiple microimages).
 c. For each microimage, i. Optionally, pad the microimage.
ii. Apply 1D FFTs in the p and q directions (i.e., within a single microimage).
iii. Interpolate all necessary points from the current microimage and place them into the correct positions in the output 2D arrays.
d. For each output image,
i. Apply 1D inverse FFTs in the x and y directions.
ii. Divide the other color channels of the image by the normalization channel.
iii. Output the image into a file.

The reason for computing the FFTs for each microimage separately is to save memory, especially when input microimages have large amounts of padding inserted; they could be done in advance as an alternative with no change in results.

Figure 11:
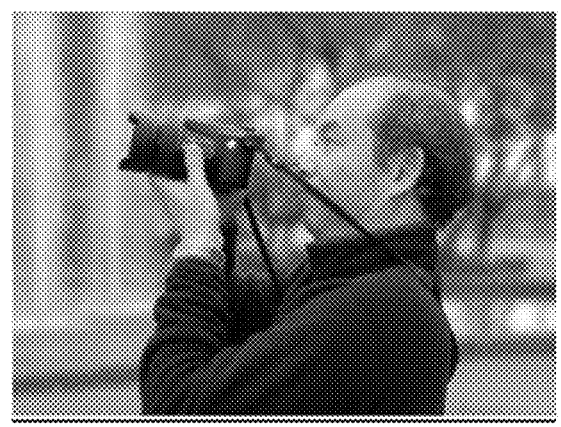
FIG. 11 illustrates photographic images of a higher quality image rendering, a lower quality image rendering, and a contrast enhanced difference between the higher and lower image renderings showing patterns of artifacts in the lower quality image rendering.
Figure 11:
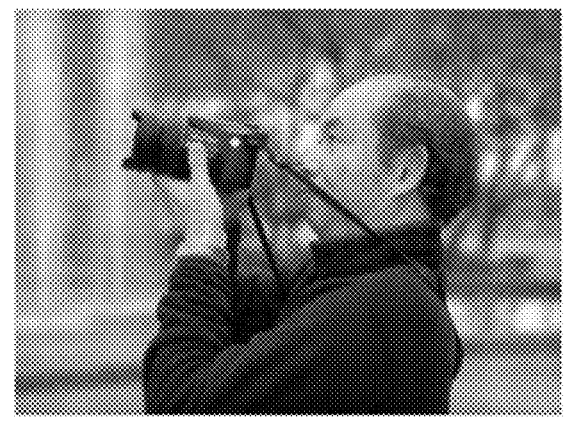
Figure 11:
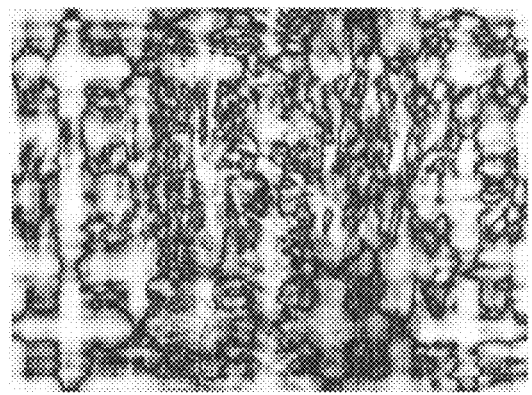

With further reference to the interpolation operations discussed above, the positions of pixels in the "slice" (Fourier transform of output image) may not directly match up with the element indices of the 4D FFT. Thus, an interpolation algorithm may be used to obtain values for those pixels. Several techniques can be used to improve output quality, although traditional interpolation methods give suboptimal quality. An optional technique used was to zero-pad the input microimages before applying FFTs (but after the cross-microimage x and y FFTs; this ordering does not matter), leading to sine-based interpolation of the FFT results. Although this extra work makes the FFTs more expensive (about 3× more computation for 2× interpolation, 6× more computation for 3× interpolation) and more memory-intensive (mitigated by processing only a few microimages at a time), it allows even nearest neighbor interpolation on the result to produce images with few artifacts. The images used in the examples herein use higher-quality settings (8×FFT-based interpolation and one-lobe Lanczos resampling), but even much less expensive settings provide limited artifacts. For example, FIG. 11 contains three versions of the same image: Image 1101 in FIG. 11 has a high-quality rendering using 8×FFT interpolation and one-lobe Lanczos resampling. Image 1102 in FIG. 11 shows the same image rendered using only 2×FFT interpolation and nearest-neighbor sampling. Image 1103 in FIG. 11 illustrates the difference between these images 1101 and 1102, with contrast enhanced to show the pattern of artifacts created by the lower-quality sampling. The use of 3×FFT interpolation and nearest-neighbor sampling produces almost invisible artifacts: the losslessly-compressed output image must be examined carefully to find the few artifacts that exist.

Figure 12:
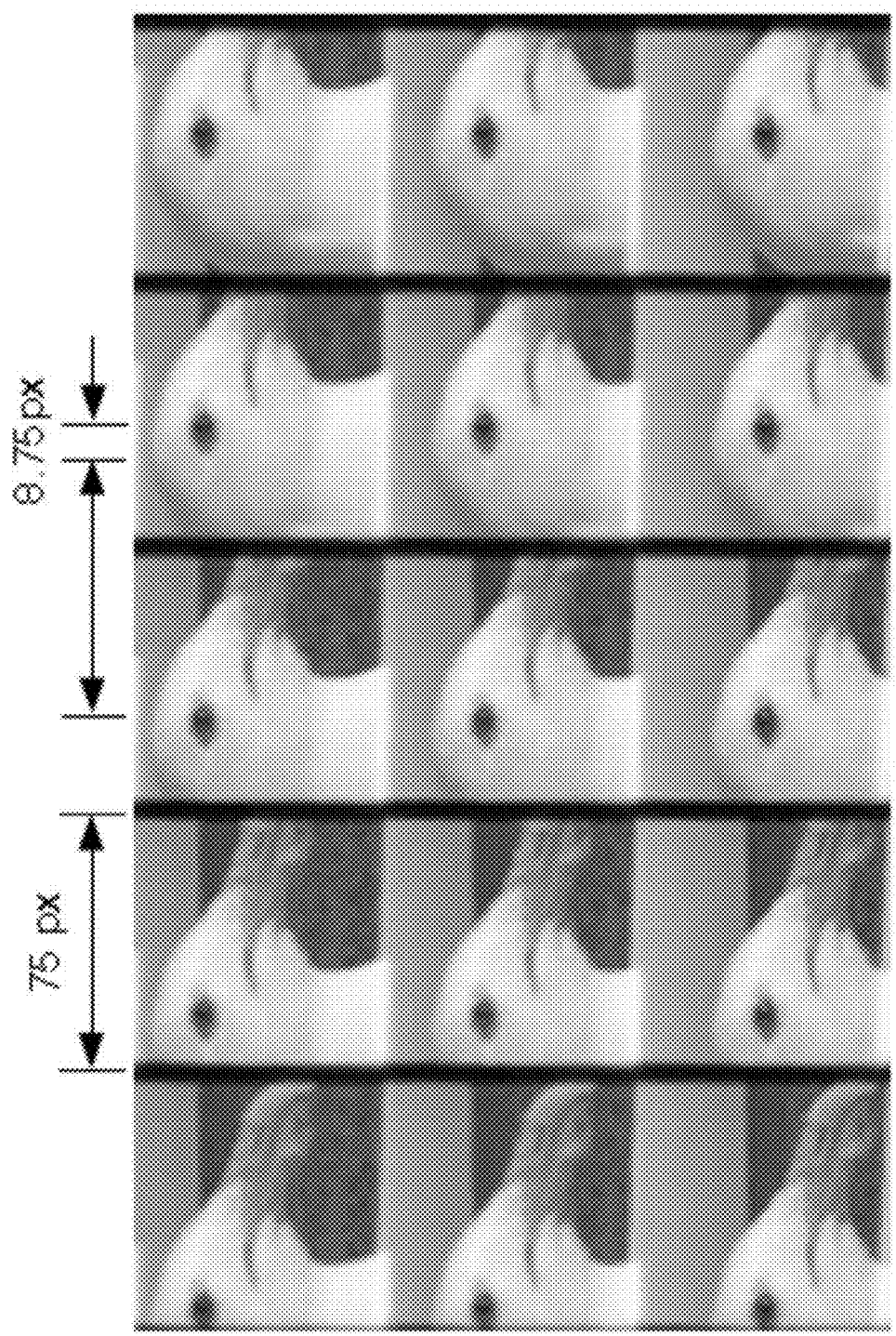
FIG. 12 illustrates photographic images of a five by three microimage of an exemplary plenoptic image of a seagull.

A number of example images rendered with the extended Fourier slice refocusing algorithm will now be described. The renderings were performed with the "seagull" and "Laura" plenoptic images from Todor Georgiev's collection at http://www.tgeorgiev.net. A portion of this image is illustrated in FIG. 12. Images were rendered spatially using an OpenGL-based rendering program. The specifications for each of the plenoptic images used are as follows. The complete plenoptic image measures 7240×5433 pixels (39 Mpix). It is comprised of 96×72 entire microimages over a range of 7176×5382 pixels, with partial microimages around the border. A square aperture was used in capturing the image, so microimages are approximately square. We note that the number of microimages does not evenly divide the number of pixels that are covered, i.e., 7176/96=74.75. This does not present an issue for the spatial rendering program, which renders directly from the 2D plenoptic data, but in order to properly create a 4D array from the 2D plenoptic data, we require an integral number of pixels for each microimage. Accordingly, the images were scaled by a slight amount to be 7200×5400 so that each microimage spanned exactly 75×75 pixels; both the spatial and Fourier-based rendering experiments used the same scaled image files as input.

Figure 13:
FIG. 13 illustrates photographic images of an individual microimage of the exemplary plenoptic image of a seagull, an enlarged region of a spatially rendered image of the exemplary plenoptic image of a seagull, and an enlarged region of a Fourier rendered image of the exemplary plenoptic image of a seagull.
Figure 13:
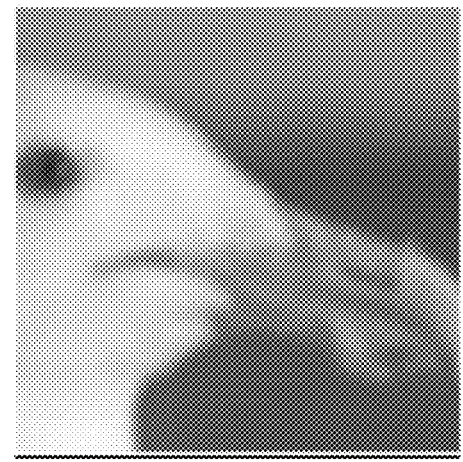
Figure 13:
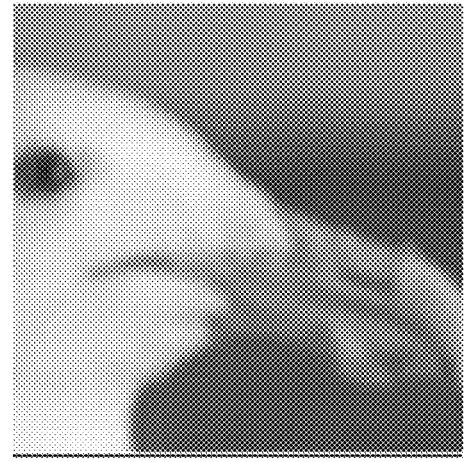

As described above, images rendered from focused plenoptic images maintain the full resolution of the individual focused microimages. FIG. 13 shows a comparison of a raw microimage 1301 from the "seagull" example, with the same region of corresponding images of FIG. 12. Image 1302 is rendered with the spatial full resolution rendering algorithm. Image 1303 is rendered with the full resolution Fourier slice algorithm. The portion of the image shown (the head of the seagull) is in focus when shifted by −8.75 pixels (or, equivalently, with a patch size of −8.75). For the full resolution Fourier slice algorithm, at patch size of −8.75 corresponds to u=−1/8.75. The full resolution Fourier slice algorithm matches the spatial full resolution algorithm, and both rendering approaches match the microimage.

Figure 14:
FIG. 14 illustrates photographic images of a plenoptic image rendering at three different focal planes for both spatial full resolution rendering and full resolution Fourier slice rendering.
Figure 14:
Figure 14:
Figure 14:
Figure 14:
Figure 14:

FIG. 14 shows a series of images rendered from the same plenoptic image (the "Laura" image from http:/fwww.tgeorgiev.net). Image 1401 is a spatially rendered image with a shift=−7.00. Image 1402 is a Fourier slice rendered image with σ=−1/7.00. Image 1403 is a spatially rendered image with a shift=−7.60. Image 1404 is a Fourier slice rendered image with σ=−1/7.60. Image 1405 is a spatially rendered image with a shift=−10.00. Image 1406 is a Fourier slice rendered image with σ=−1/10.00. The images are rendered with the full resolution spatial rendering algorithm using shift values (patch sizes) of −7.00, −7.60, and −10.00, which are focused on the background, midground, and foreground, respectively. The same planes were rendered using the full resolution Fourier slice algorithm, using slope (u) values of −1/7.00, −1/7.60, and −1/10.00. The full resolution Fourier slice algorithm fully recapitulates the spatial rendering algorithm.

The focused plenoptic camera trades off spatial for angular resolution. As a result, artifacts can result in out-of-focus regions during full resolution rendering if insufficient angular samples are captured. Approaches have been developed to address these issues. It is interesting to note that since the full resolution Fourier slice algorithm recapitulates the spatial algorithm, it will produce the same artifacts.

Figure 15:
FIG. 15 illustrates photographic images of an enlarged region of the same image rendered using both spatial full resolution rendering and full resolution Fourier slice rendering.
Figure 15:

Enlarged versions of both spatial and Fourier renderings of the same image are illustrated in FIG. 15. Image 1501 is a spatially rendered image with a shift=−10.00. Image 1502 is a Fourier slice rendered image with σ=−1/10.00. The artifacts on foreground objects in the images are almost identical, while the patterns of artifacts in the backgrounds differ slightly (due to slightly different handling of interpolation and of microimage boundaries between the two approaches).

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method of operating a plenoptic image processing system, the method comprising:
    storing plenoptic image data in a non-transitory computer readable memory of the system, the plenoptic image data comprising data of a plurality of microimages;
    applying a frequency domain transform to the stored plenoptic image data to provide a frequency domain plenoptic image data structure stored in the non-transitory computer readable memory of the system;
    processing the frequency domain transformed plenoptic image data structure using an extended slice technique to select a focal plane from the data structure, wherein the extended slice technique comprises taking multiple slices of the frequency domain transformed plenoptic image data structure and configuring the multiple slices to provide extended slice data;
    applying an inverse frequency domain transform to the extended slice data to provide inverse transform extended slice data; and
    providing an image output based upon the inverse transformed extended slice data.

2. The method of claim 1 further comprising selecting, prior to applying the frequency domain transform, respective center portions of at least a subset of the plurality of microimages, and forming, prior to applying the frequency domain transform, a four-dimensional array from the respective center portions of at least a subset of the plurality of microimages, the four-dimensional array comprising x and y positions of the array and x and y positions within each microimage of the array.

3. The method of claim 1 wherein the frequency domain transformed plenoptic image data structure is a multi-dimensional array the method further comprising normalizing the array to compensate for different numbers of the microimages overlapping at different points.

4. The method of claim 1 further comprising applying, prior to applying the frequency domain transform, a window function to effective reduce the influence of the outer portions of the microimages on the image output.

5. The method of claim 1 further comprising, prior to applying the frequency domain transform, padding the microimages effective to increase accuracy of an output of the frequency domain transform.

6. The method of claim 1 wherein the frequency domain transformed plenoptic image data structure is a four-dimensional array and the extended slice technique comprises taking a two-dimensional slice of the four-dimensional array.

7. A method according to claim 6 wherein the inverse frequency domain transform comprises a 2D inverse FFT.

8. The method of claim 1 wherein providing an image output based upon the inverse transformed extended slice data comprises displaying the image output on a display of the system.

9. The method of claim 1 wherein the plenoptic image data is captured by a focused plenoptic camera, wherein the focused plenoptic camera includes a main lens, a microlens array including plurality of microlenses, and a photosensor, each microlens in the microlens array having a focal distance $f$, the microlens being positioned a distance a behind a focus of the main lens and a distance b in front of the photosensor, wherein a, b, and f together satisfy the equation: $1/a+1/b=1/f$.

10. The method of claim 1 wherein the image processing system is structured as one of a personal computer, a digital camera, a smartphone, and a tablet computer.

11. The method of claim 1 further comprising performing, prior to applying the frequency domain transform, the following operations:
    selecting respective center portion of at least a subset of the plurality of microimages;
    forming a four-dimensional array from at least a subset of the respective center portions, the four-dimensional array comprising x and y positions of the array and x and y positions within each microimage of the array;
    normalizing the array to compensate for different numbers of microimages overlapping at different points;
    applying a window function to reduce the effect of the outer portions of each microimage; and
    padding each microimage.

12. The method of claim 1 wherein the processing comprises:
    applying a 4D Fast Fourier Transform ("FFT") to the array;
    creating a 2D slice from the array; and
    applying a 2D inverse FFT to the slice.

13. The method of claim 1 wherein the acts of applying a frequency domain transform and processing comprise:
    generating a 4D array of windowed portions of the microimages;
    applying 1D FFTs in the x and y directions;
    for each microimage, optionally padding the microimage, applying 1D Fast Fourier Transforms ("FFTs") in the p and q directions, and interpolating all necessary points from a microimage to place them into the correct positions in the output 2D arrays;
    for each output image, applying 1D inverse FFTs in the x and y directions, dividing the other color channels of the image by the normalization channel, and outputting the image into a file.

14. An image processing system comprising:
    a non-transitory computer readable memory configured to store plenoptic image data;
    a processor structured to:
        apply a frequency domain transform to the stored plenoptic image data to provide a frequency domain transformed plenoptic image data structure stored in the non-transitory computer readable memory,
        take an extended slice of the frequency domain transformed plenoptic image data structure by taking multiple slices of the frequency domain transformed plenoptic image data structure and combining the multiple slices to provide extended slice data, and
        apply an inverse frequency domain transform to the extended slice data to provide output image data; and
    an output device configured to receive the output image data.

15. The system of claim 14 wherein the processor is configured to perform the following operations prior to applying the frequency domain transform:
    select respective center portion of at least a subset of the plurality of microimages;
    form a four-dimensional array from at least a subset of the respective center portions, the four-dimensional array comprising x and y positions of the array and x and y positions within each microimage of the array;

normalize the array to compensate for different numbers of microimages overlapping at different points;

apply a window function to reduce the effect of the outer portions of each microimage; and pad each microimage.

16. The system of claim 14 wherein the plenoptic image data is structured as an array and the processor is configured to:

apply a four-dimensional Fast Fourier Transform ("FFT") to the array;

create a two-dimensional slice from the array; and apply a two-dimensional inverse FFT to the slice.

17. The system of claim 14 wherein the processor is configured to:

generate a 4D array of windowed portions of the microimages;

apply 1D FFTs in the x and y directions;

for each microimage, optionally pad the microimage, apply 1D FFTs in the p and q directions, and interpolate all necessary points from a microimage and place them into the correct positions in the output 2D arrays;

for each output image, apply 1D inverse FFTs in the x and y directions, divide the other color channels of the image by the normalization channel, output the image into a file.

18. The system of claim 14 wherein the output device comprises one of a non-transitory memory device configured to store the image data as a file, and a display operatively coupled with the processor and configured to display the image data.

19. An image processing system according to claim 14 wherein the plenoptic image data is captured by a focused plenoptic camera, wherein the focused plenoptic camera includes a main lens, a microlens array including plurality of microlenses, and a photosensor, each microlens in the microlens array having a focal distance $f$, the microlens being positioned a distance a behind a focus of the main lens and a distance b in front of the photosensor, wherein a, b, and $f$ together satisfy the equation: $1/a+1/b=1/f$.

20. The image processing system according to claim 14, wherein the extended slice comprises a central slice and slice extensions, wherein the extended slice is formed by appending the slice extensions to respective ends of the central slice.

* * * * *